United States Patent
Russell

(10) Patent No.: US 8,817,074 B2
(45) Date of Patent: Aug. 26, 2014

(54) METHOD OF CALCULATING 3D OBJECT DATA WITHIN CONTROLLABLE CONSTRAINTS FOR FAST SOFTWARE PROCESSING ON 32 BIT RISC CPUS

(75) Inventor: Stuart Russell, Kanata (CA)

(73) Assignee: You I Labs, Inc., Kanata (CA)

(*) Notice: Subject to any disclaimer, the term of this patent is extended or adjusted under 35 U.S.C. 154(b) by 445 days.

(21) Appl. No.: 13/024,814

(22) Filed: Feb. 10, 2011

(65) Prior Publication Data

US 2012/0206572 A1    Aug. 16, 2012

(51) Int. Cl.
*G06T 15/20* (2011.01)
*G06T 15/00* (2011.01)

(52) U.S. Cl.
CPC .......... *G06T 15/005* (2013.01); *G06T 15/20* (2013.01)
USPC ........................................................... 348/46

(58) Field of Classification Search
CPC .......... G06T 15/005; G06T 1/20; G06T 1/00; G06T 2210/52; G09G 5/363
USPC ............ 348/46; 345/643, 423, 51; 715/864; 340/46
See application file for complete search history.

(56) References Cited

U.S. PATENT DOCUMENTS

| | | | |
|---|---|---|---|
| 6,262,739 B1* | 7/2001 | Migdal et al. | 345/423 |
| 2005/0062762 A1* | 3/2005 | Wang et al. | 345/643 |
| 2005/0091616 A1* | 4/2005 | Wang et al. | 715/864 |
| 2006/0152579 A1* | 7/2006 | Utsugi et al. | 348/51 |

* cited by examiner

*Primary Examiner* — Dave Czekaj
*Assistant Examiner* — Berteau Joisil
(74) *Attorney, Agent, or Firm* — Gowling Lafleur Henderson LLP; Mark Sprigings

(57) ABSTRACT

Systems and methods are described to allow arbitrary 3D data to be rendered to a 2D viewport on a device with limited processing capabilities. 3D vertex data is received comprising vertices and connections conforming to coordinate processing constraints. A position and orientation of a camera in world co-ordinates is received to render the 3D vertex data from. A processing zone of the plurality of processing zones the position of the camera is in is determined. The vertices of the 3D vertex data assigned to the determined processing zone are transformed based on the position and orientation of the camera for rendering to the viewport.

22 Claims, 10 Drawing Sheets

| | | | | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

0, 0   4096, 0   32768, 0

32768, 32768

METHOD OF CALCULATING 3D OBJECT DATA WITHIN CONTROLLABLE CONSTRAINTS FOR FAST SOFTWARE PROCESSING ON 32 BIT RISC CPUS

TECHNICAL FIELD

The current disclosure relates generally to the field of three-dimensional (3D) vertex processing and in particular to efficiently processing 3D vertex data on a 32 bit load-store architecture processor lacking a floating-point processing unit (FPU).

BACKGROUND 3D graphics requires a large amount of vertex data for objects to be processed from original, or object location, through camera positioning, perspective, and final transformation into 2D space for presentation to the viewer. Since the data is in 3 dimensional space, the standard Cartesian coordinate system (three perpendicular axis $-X, Y, Z$), as well as the spherical coordinate system ($\rho, \theta, \phi$) may be used for representation.

A point whose rectangular coordinates are given by (X, Y, Z) will have homogenous coordinates (X, Y, Z, 1) which can be represented by 4×4 matrices. This format allows for ease of representing the transformations required for scaling, rotating, and translating the coordinates from object space to final pixel (2D) space.

When rendering an object or scene from 3D onto a 2D viewport the object coordinates must be transformed according to the camera's position and orientation and then projected onto a 2D plane. Transforming each coordinate requires a large amount of processing power.

The processing requirements necessary to transform 3D points make 3D graphics difficult or expensive to provide on a mobile device, or other device having a limited processor capability. Therefore there is a need for an improved method and apparatus for processing 3D vertex data on computationally limited processors.

SUMMARY

In accordance with the present disclosure there is provided a method for rendering 3-dimensional (3D) vertex data to a 2-dimensional (2D) viewport using integer based arithmetic of a 32-bit load store architecture processing unit lacking a floating-point processing unit (FPU). The method comprising receiving at the processing unit 3D vertex data comprising a plurality of vertices and connections between vertices conforming to coordinate processing constraints limiting a maximum length of the connections between vertices to ½ of a maximum vertex coordinate range of $-2^x$ to $+2^x$; receiving at the processing unit a position of a camera to render the 3D vertex data from; culling from rendering to the 2D viewport each vertex of the plurality of vertices having a distance from the camera position along at least one axis greater than the maximum length constraint; and rendering to the 2D viewport remaining vertices using a transformation matrix comprising a plurality of values having a maximum value of $2^y$, wherein $x+y<=32$.

In accordance with the present disclosure there is also provided a method of processing 3D vertex data to conform to coordinate processing constraints for further processing using integer arithmetic using a processor, the processor executing instructions stored in a memory implementing the method comprising receiving 3D vertex data comprising a plurality of vertices and connections; adding one or more vertices to the 3D vertex data to subdivide connections between two vertices so that the all connections have a maximum size determined by a maximum length constraint of 215; and assigning each of the vertices of 3D data to at least one respective processing zone of a plurality of processing zones, wherein the 3D vertex data is provided to a 32-bit load store architecture processor lacking a floating-point processing unit (FPU).for rendering to a 2D viewport.

In accordance with the present disclosure there is also provided a device for rendering 3D vertex data, the device comprising: a display for displaying information; a 32-bit load-store architecture processor lacking a floating-point processing unit (FPU) for executing instructions; a memory for storing instructions that when executed by the processor configure the device to implement a method of processing 3D vertex data for rendering to the display using integer arithmetic comprising: receiving at the processing unit 3D vertex data comprising a plurality of vertices and connections between vertices conforming to coordinate processing constraints limiting a maximum length of the connections between vertices to a maximum length constraint of $-2^x$ to $+2^x$; receiving at the processing unit a position of a camera to render the 3D vertex data from; culling from rendering to the 2D viewport each vertex of the plurality of vertices having a distance from the camera position along at least one axis greater than the maximum length constraint; and rendering to the 2D viewport remaining vertices using a transformation matrix comprising a plurality of values having a maximum value of $2^y$; wherein $x+y<=32$.

In accordance with the present disclosure there is also provided a device for processing 3D vertex data, the device comprising: a processor for executing instructions; and a memory for storing instructions that when executed by the processor configure the device to implement a method of pre-processing 3D vertex data for eventual rendering to a display of a device having a 32-bit load-store architecture processor lacking a floating-point processing unit (FPU), the method comprising: receiving 3D vertex data comprising a plurality of vertices and connections; adding one or more vertices to the 3D vertex data to subdivide connections between two vertices so that the all connections have a maximum size determined by a maximum length constraint of $2^{15}$; and assigning each of the vertices of 3D data to at least one respective processing zone of a plurality of processing zones; wherein the 3D vertex data is provided to a 32-bit load store architecture processor lacking a floating-point processing unit (FPU).for rendering to a 2D viewport.

BRIEF DESCRIPTION OF THE DRAWINGS

Various embodiments will be described with reference to the appended figures in which.

DETAILED DESCRIPTION

Figure 1:
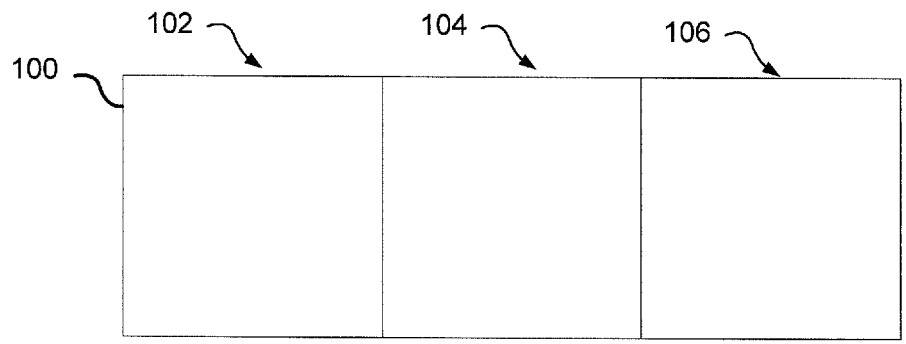
FIG. 1 depicts an object in 2D space.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In order to process 3D vertex data efficiently on a device with a computationally limited processor, for example a 32 bit RISC CPU that does not have a floating point unit (FPU), the 3D vertex data needs to be constrained so that the arithmetic required for transforming the 3D vertex data can be calculated using 32 bit integer arithmetic. Since the object data is created externally and not developed within any given constraints before being presented to the current vertex processing system, the object coordinates can be in any arbitrary range from −infinity to +infinity, with an unknown minimum resolution.

The process described herein allows a computationally limited processor such as a 32 bit load-store architecture CPU core lacking any floating point operational support or Floating Point Processing Unit (FPU) to efficiently process arbitrary 3D data. Although referred to as a 32 bit RISC CPU or a 32 bit CPU without floating point capabilities, different CPUs may be used. However, if the CPU is provided with a floating point unit, the optimizations and processes described herein may not be necessary since the CPU may be able to efficiently processes floating point numbers.

Given that the target processor is a 32 bit processor, calculations for addition, subtraction, and multiplication used during the processing of vertex data are optimized for dealing with 32 bit integer values. Given that any two 32 bit numbers multiplied together can result in a maximum value of 2×32=64 bits, which exceeds the processor's optimized calculation zone, resulting in a need for 64 bit storage for data, values used in rendering the 3D data is constrained so that the product fits within 32 bits. In rendering a vertex, the coordinates of the vertex are multiplied by a value in a transformation matrix. The coordinate values and the values of the transformation matrix are constrained so that their product fits within 32 bits. As a result, the maximum coordinate values are constrained to $2^x$ and the maximum values of the transformation matrix are constrained to $2^y$, where $x+y<=32$. It will be appreciated that allowing for larger values in the transformation matrix will required smaller values for the vertex coordinates. In developing the constraints further below, it is assumed that the vertex coordinates and the transformation matrix values are both constrained to $2^{16}$. It will be appreciated that although both values are constrained to 16 bits it is possible to constrain the values differently. For example, the transformation value could be constrained to fit within 15 bits, while the coordinate values are constrained to fit within 17 bits.

Specific coordinate constraints are developed further below assuming transformation values constrained to 16 bits. Similar coordinate constrains can be easily determined for use with transformation values constrained to a different value.

Rotational Constraints

Rotational processing (Z axis) of object data has the form of:

$$\begin{matrix} \cos\theta, & \sin\theta, & 0, & 0 \\ -\sin\theta, & \cos\theta, & 0, & 0 \\ 0, & 0, & 1, & 0 \end{matrix}$$

It can be seen that a maximum value for coordinates is at 45 degrees: cos (45 dg)=~0.707 and sin(45 dg) is ~0.707. At this position, the maximum calculable value (using X as the example term) is in the range of 0.707*X+0.707*Y, which needs to reside within a total constraint of 32 bits. Since applying the maximum 16 bit signed positive value of 32767 into this formula for both X and Y, the final result becomes 32767*0.707+32767*0.707=~23170+23170=~46340, which exceeds the 16 bit limit by (46340−32768)=13573. To keep this maximum within the calculable range, the maximum coordinate max M=(32767/2)/0.707=~23170. This results in an upper and lower limit for object coordinates that allows rotation of the object.

Trigonometric Optimizations

Dealing with trigonometric calculations, such as the sin and cosine calculations required for rotation calculations, is very slow, even on high end processors. Since the calculations are targeting 32 bit RISC processor, it is desirable to avoid the calls to these functions. Using a lookup table for each of sin, cosine, tan and their inverse equivalents, it is possible to remove the need to use the math functions.

Since the vertex processing system is limited to 32 bit calculations with the vertex coordinates limited to 16 bit range values, the trigonometric functions must not exceed 16 bit range, and the total calculation of object coordinate data multiplied by the largest possible values of cosine (0) or sin (90 dg) must not exceed 32 bit data.

Since both sin and cosine have ranges from −1 to +1 in native format, it is possible to scale the values such that they make use of 14 bits of precision:

$$16=\{A\}\{B\}\cdot\{C\}$$

Where A is 1 bit for sign (+/−)
B is 1 bit for integer unit value (1, or 0)
C is fractional value, 14 bits This results in a trigonometric table with the best possible 16 bit range −1 to +1 with (½^14)=0.000061 step size precision. Furthermore, this provides a built in scaling factor of 14 bits, since the decimal point location is removed when represented by an integer resulting in an effective multiplication or bit shifting of 14 bits. This can be used to provide an apparent reduction in the scale of an object without resorting to floating point scaling.

The trigonometric table size can range from 360 units (1 dg resolution) through 16384 units (~0.022 dg resolution) as required. The table size used is based on the expected CPU cache size available to minimize external memory bus access during the calculation phase, typically 4096 units, or ~0.0879 dg resolution.

Translation Constraints

Translation processing (X, Y, Z axis) of object data has the form of:

$$\begin{matrix} 1, & 0, & 0, & 0 \\ 0, & 1, & 0, & 0 \\ 0, & 0, & 1, & 0 \\ H, & K, & L, & 1 \end{matrix}$$

Maximum translation values are given by:
X+H
Y+K
Z+L

Taking the constraint into consideration it can be seen that (using X as our example term) the range is limited to −32767<(X+H)<32767. This is satisfied with the original limits on the coordinates of 23170 if H is in the range of 0-9597. This becomes the total limit on translation of object coordinates.

Scaling Constraints

Scaling processing (X, Y, Z axis) of object data has the form of:

$$\begin{matrix} A, & 0, & 0, & 0 \\ 0, & B, & 0, & 0 \\ 0, & 0, & C, & 0 \\ 0, & 0, & 0, & 1 \end{matrix}$$

Maximum scaling values are given by:
A*X
B*Y
C*Z

The scaling calculation causes the most disruption to the vertex processing range since scale values result in an upper limit of object coordinates such that (using X as our example term)−23170<(MaxScale*X)<23170. Given a sample scaling range of 0-10, it can be seen that the object coordinates are now very limited at 23170/10=+/−2317. Since the coordinates are limited to integer values this results in a maximum scene dynamic range of only −2317 to 2317=
(in units)
1(min) to 4634(max)
=~37 dB 3D dynamic range This is a drastic reduction from the original range of +/−23170, which would provide ~47 dB of dynamic range.

Furthermore, given the constraint of integer values, scaling values between 0 and 1.0, that is reducing values, are not possible without additional processing. This is a concern since largest coordinates are limited to the range of +/−23170, making it complex to support only scaling for increasing the apparent dimensions of objects. To accommodate this, a fixed point scaling ratio of 8 bits is used providing a scale factor (256)=actual scale (1). This provides a range from 1/16384 to 32767/16384 in 1/16384 increments to the user: ~0.000061 to ~2 with a step size of ~0.000061. Within this constraint the valid max coordinate pairs are now −23170<(2*X)<23170, resulting in:
23170/2=+/−11585.
=~40.6 dB dynamic range However, the valid maximum based on scaling for reduction is now:
−23170<(X/16384)<23170, resulting in:
23170*16384=+/−44334080. (limited at +/−22130)

Since the coordinates are constrained to 16 bit values to fit into a 32 bit product total size, the scaling values permit object coordinates up to a maximum of +/−32767. It should be noted that although the scaling factors permit larger coordinate values, the scaling factor is limited to (scaling factor*coordinate)<22130. The final inputs are limited to 22130 to allow at least 1024 range for translations in place prior to further processing. The number of 22130 is derived from (23170−1024−16)=22130, the extra 16 is a 'fudge factor' that allows room for actual 1024 range without potential for overflow from "off by 1" mathematical rounding errors in the subsequent stages, then rounded to the nearest "easier to remember" decimal value ending in 0. For normal use, the maximum length of a connection between coordinate pairs is limited to 22130 to prevent this occurrence. With the inclusion of the scaling factor from 1/16384 the theoretical dynamic range of content is now:
10*log(22130/(1/16384)).
=~85.6 dB dynamic range However, it should be noted that since all calculations are based on integer values, this dynamic range cannot be used in displayed content, only during content manipulation in vertex processing.

Although the coordinate values are constrained to be in the range of +/−22130 so that a result of the coordinates and transformation matrix calculations will fit within 32 bits, the maximum length of a connection between two vertices along an axis is constrained to ½ the maximum coordinate range or 22130.

The maximum coordinate constraint of +/−22130 provides sufficient range of values within 16 bits to allow a vertex to be transformed. As described above, the maximum coordinate constraint allows the vertex to be rotated, scaled and translated according to the transformation matrix while ensuring that the resultant value will be representable in 32 bits. Different constraints may be used. For example, if the vertices will not be transformed at all, it is possible to use a maximum coordinate range of $2^{16}$ ($-2^{15}$ to $+2^{15}$). Similarly a smaller constraint on the coordinate range may be used to provide less constraints on the allowable transformations, for example providing a larger range for translations.

The above sets out the maximum coordinate constraints for use with transformation values constrained to 16 bits that can be used to provide efficient 3D transformations using a 32 bit RISC processor. Since the vertex processing system should be able to process arbitrary coordinates, it is necessary to preprocess the 3D vertex data to conform to the maximum coordinate constraints.

World View Constraints 3D content is usually limited to a "visible" frustum for the final display on a 2D display. This frustum mimics the field of view of the observer and provides a near clip for objects too close to be viewed correctly, a far clip for objects beyond reasonable view distances and a trapezoidal clip along X (left/right) and Y (up/down) between these ranges. Clipping to the view frustum is typically calculated after vertex transformation, requiring that all object coordinates in the 3D world are properly transformed as desired. By culling vertices that are outside of a calculable range from the camera position as described further herein it is possible to efficiently reject coordinates that fall outside of the calculable range of the maximum coordinate constraint and ensure all coordinates processed meet the maximum coordinate constraints for efficient processing on a 32 bit processor.

For clarity of the description, the methods and systems are described with regards to 2D coordinate pairs. Referring to FIG. 1, a 2D object 100 comprising a plurality of vertices and connections is depicted, which has a width that exceeds the maximum coordinate range of +/−22130. This object 100 can easily be divided into 3 sections 102, 104 and 106 as shown by adding additional vertices 108. The coordinate values within each section will be within the calculable range of the maximum coordinate constraint if the coordinates are normalized to the each section. Each section could then be processed individually, and the processed sections reconstructed afterwards into the correct position relative to the other sections.

Figure 2:
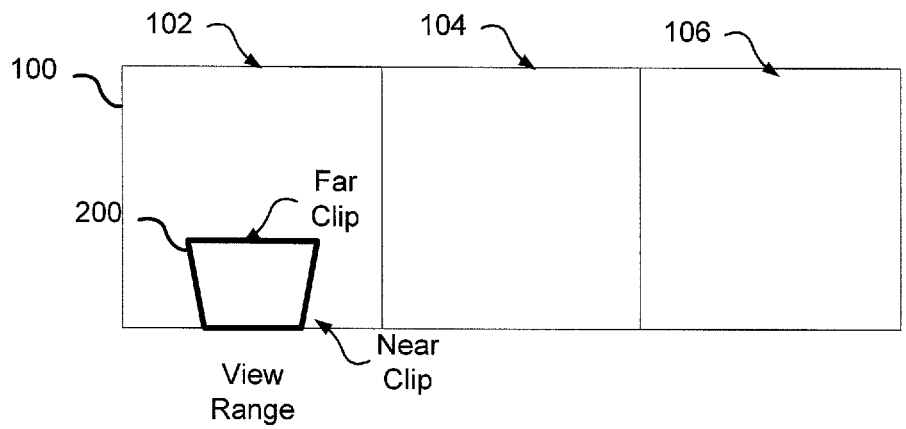
FIG. 2 depicts a view frustum and the object of FIG. 1.

However as seen in FIG. 2, taking into account the view frustum 200, it can be seen that only a portion 202 of the original object 100 can be visible through the view frustum 200 at any one time. If the vertices that will not be visible in the view frustum 200, or at least a portion of these vertices, are culled from additional processing much less data processing is required to display the final view and the vertex data can be efficiently rendered on a limited processor.

Figure 3:
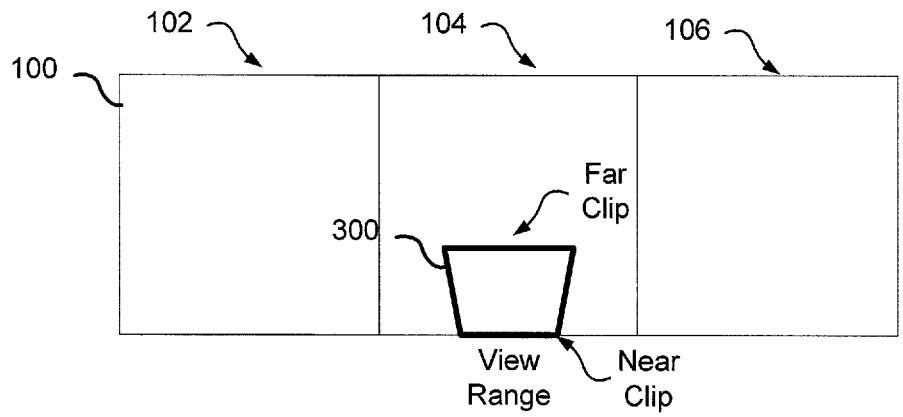
FIG. 3 depicts a view frustum in a different location than the view frustum of FIG. 2.

Given an arbitrary near and far clip that fall within the original constraints, a simple vertex rejection for points beyond the view frustum will provide clipping to prevent invalid coordinate values from being processed. However, if the view frustum is moved further along the width, for example if the camera position is translated along the x-axis, the coordinate values will increase until they are in an unusable range. As depicted in FIG. 3, as the view frustum 300 is translated, the coordinate values of the visible vertices and connections 302 will exceed the coordinate constraints.

Figure 4:
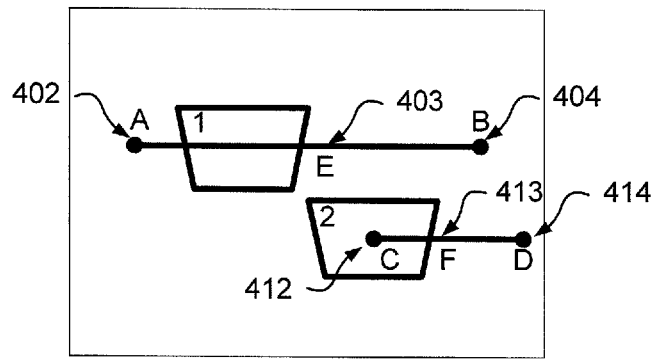
FIG. 4 depicts the view object normalized to the view frustum of FIG. 3.

To account for this, the coordinate system is normalized to the view frustum prior to vertex processing. To accomplish this, a vertex translation stage based on the location of the view frustum is performed prior to the matrix multiplication for object placement and perspective that clips to the viewable area. The vertex translation can normalize the vertex coordinates, and the view frustum 400, to the view frustum as depicted in FIG. 4. This vertex translation can be a simple subtraction that can be efficiently determined, even for arbitrary coordinate values larger than 32 bits. The coordinates of the visible vertices and connections 302 will satisfy the maximum coordinate constraints following the vertex translation. As a result, any vertices that do not satisfy the maximum coordinate constraint, which again can be efficiently determined, can readily be culled from further processing. The coordinates of the remaining vertices after culling will meet the maximum coordinate constraints and so can then be processed efficiently on a 32 bit processor.

The concept is essentially to cut the world data into processing groups to see only what is in the currently visible range (within the constraints). For example, a triangle in one mesh located at {0,0,0}, {10,10,0}, {−10,10,0} is easily handled within the constraints but one at {56000,0,0}, {56010,0,0}, {55990,0,0} cannot be processed within the constraints without translation into a valid range and therefore not processed or visible. The processing groups may be used to cull vertices not in the view range and then pre-translate the vertices into a processable range based on the location of the processing group when the user camera requires it. The culling essentially removes the portion of the camera location within the world that exceeds the possible processable range and pre-applying it to the vertices. Any vertices that are outside of the processable range after the translation are culled. This allows the final processing camera to scan the entire range of the world coordinates, but prevents coordinates outside the processable range from being processed.

As an example using the triangle above, if the camera is translated to {50000, 0, 0} this would normally be outside of the processable range and not usable, however objects are pre-translated such that the triangle at {56000,0,0}, {56010, 0,0}, {55990,0,0} would now be at a virtual location of {6000,0,0}, {6010,0,0}, {5990,0,0} which is usable, and the camera location would be normalized to {0,0,0}. This translation may be done prior to any normal camera transformation operations. The translation may take into account the current angle of the view camera as well as its translation so that the normalized camera position will be the final position of the camera used for rendering.

Coordinate Import Processing

When objects are imported from their native format the coordinates of the vertices may be expressed using floating point numbers. However, in order to be efficiently processed by the 32 bit processor, the coordinates must all be integer values. In order to remove any fractional components of the vertices, the data may be scaled to remove any fractional components to fit within the integer storage. For example, if the data is a square with vertices at (−0.5, 0.5), (0.5, 0.5), (−0.5, −0.5) and (0.5, −0.5) all vertices may be scaled by a factor of 10 so that the resultant vertices are integers, namely (−5, 5), (5, 5), (−5, −5) and (5, −5). However it may not be possible to scale all data easily. For, example if one vertex coordinate is at $2^{65}$ while a second coordinate is at $2^{-30}$ it is not practical to remove the fractional components by scaling only. In such a case, the fractional components may be removed by scaling up the coordinate to get rid of any fractional components by analyzing the smallest delta between coordinates. Any connections that exceed the maximum length are subdivided and the increase in polygons is kept track of. If the increase in polygons is acceptable, which will vary depending on the target platform or other application factors, then the fractional components are removed. If however, the polygon increase is unacceptable, that is too many polygons were added while subdividing the scaled up coordinates, than the process is restarted with the original fractional data but using a smaller initial scaling value and then subdivide the connections, again tracking the polygon increase. If the increase is acceptable, any remaining fractional components are truncated or rounded. This process provides a balance between loss of detail and increasing polygon count.

As an example, consider an object that is a large table with a bowl of fruit on it. Parts of the fruit (round surfaces) would have much more detail and higher polygons than the table. If the table must be scaled down the import process will remove detail from the fruit until all vertices are integers. This would result in a loss of data, but allows for the large table to be fully viewable.

To retain detail, objects having such a different level of detail may be better handled separately such that the scaling process can combine them during rendering (by reducing the fruit or enlarging the table) and more detail can be retained in the original objects. Since each object may have a different minimum vertex differential, this scale factor must take into account the lowest of all the objects if no data is to be lost. In some cases it is beneficial to scale at a lower factor that removes detail as the original source was intended for high resolution desktop viewing and the detail is not applicable to lower resolution, devices typically associated with 32 bit RISC CPUs.

To accommodate the culling that normalizes the coordinate system to the view frustum, the data should not include connections between vertices that exceed maximum length constraint. The maximum length constraint is ½ the maximum coordinate range so that when vertices are normalized to the camera position, the coordinates will be within −MaxLength to +MaxLength, which is within the calculable range of the maximum coordinate values range. The import process normally scales the vertices to fit the maximum world range, and then subdivides any connection between vertices where the connection length exceeds the maximum length for a single line.

Figure 5:
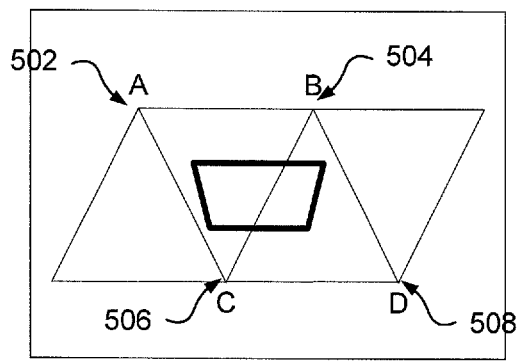
FIG. 5 depicts possible vertex and line segment locations with respect to two view frustums.
Figure 6:
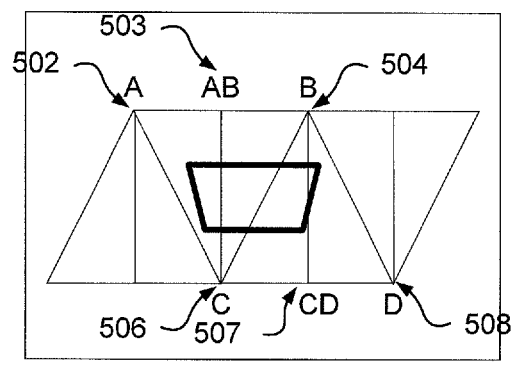
FIG. 6 depicts illustrative vertices of a triangular mesh.
Figures 7, 8:
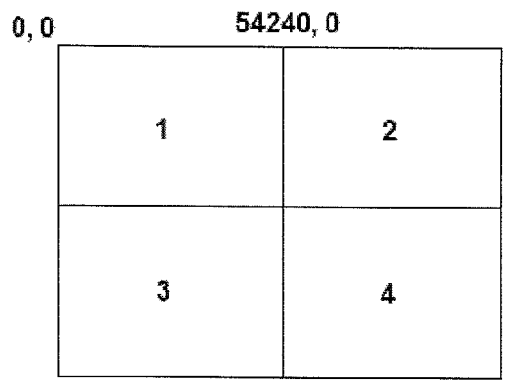
FIG. 7 depicts a possible subdivision of the vertices of FIG. 6.
FIG. 8 depicts an illustrative arrangement of processing zones in 2D.

As can be seen in FIG. 5, the line 506 between vertex points A and B lays out side of the view frustum 502 and the calculable range 504 of vertices once normalized to the view frustum. In most 3D systems, the vertices are processed as normal, and then clipped to the view frustum along the line segment that connects the two vertices such that the viewable portion of the line segment is still rendered. This is not possible given the processing constraints unless ($\Delta AB<44260$). The line AB 506 will not be rendered from the first view frustum 502 using the current method since the vertices A and B will be outside the maximum coordinate range 504 once normalized to the view frustum 502 and so not processed further in the rendering pipeline. The same case exists for the second view frustum 508, wherein vertex C lies within the view frustum 508, but vertex D exists at a distance that exceeds the maximum coordinate range 510 and so will be culled from processing. As a result of vertex D being culled from further processing in the rendering pipeline, the line CD 512 will not be rendered To handle these possible anomalies, the input data is processed to subdivide all triangles whose edges exceed % of the maximum coordinate range of 44260 (−22130 to +22130) or 22130 in total length. The subdivision process is depicted in FIGS. 6 and 7. Two potentially visible triangles, ABC (602, 604,606) and BCD (604,606,608) may both contain connections that exceed the maximum length constraint for connections between vertices. This can be satisfied by subdividing along the longest edge until no visible artifacts are seen during the rendering phase from vertices clipped outside of the processing constraints. The subdivide process splits vertices equally along the length being subdivided. It is desirable to ensure that no vertex that is only marginally outside of the view frustum is incorrectly clipped. This would result in "holes" in the object from triangles that are not rendered as one of the vertices is not visible. By subdividing further it is possible to prevent this type of visual artifact (since a new vertex would be created within the view and the new triangle rendered), but subdividing too heavily could result in too many vertices and slow processing. It is possible to control the level of subdividing during the import phase in order to reduce the amount of processing performed during rendering at the possible of expense of more visual artifacts. This is normally satisfied with all edges less than the maximum length constraint of 22130, but may be less depending on the complexity of the scene and position of the view frustum. This processing can be handled in the import stage with user interaction to ensure the level of artifacts is kept to an acceptable level for the particular application.

A sample result of the subdivision process applied to the vertices of FIG. 6 is shown in FIG. 7. New vertices AB (602, 604) and CD (606, 608) have been created that divides the length of the connections so that all of the connections will meet the maximum length constraint. Triangles A,AB,C (602, 603, 606), AB,B,C (603, 604, 606), B,C, CD (604, 606, 607), and B,D,CD (604, 608, 607) will all have a length along an axis of connections between vertices that satisfies the maximum length constraint. The tradeoff to this method is the increase in triangles to be rendered, however it must be remembered that this is only applicable when very large vertex differences exist in the original object data, and the processing speed of vertex data with the constraints is in an order of 100× faster than possible with original source data range support.

Processing of the vertex data conforming to the maximum length constraint as described above normalizes vertex coordinates to a camera position. This normalization may be done dynamically by subtracting the camera position from each vertex position. Conceptually the dynamic normalization determines a processing group of vertices that are within a calculable range of the camera position and drops all other vertices not in the processing group from further processing. Alternatively, the normalization may be based on static processing groups. As described further below, each vertex is associated with one or more processing groups based on its coordinates. The coordinates of the vertices may be normalized to the processing group. Conceptually this cuts the viewable world into a plurality of static groups or sections and translates each section to the origin so that all vertices within the processing group will be within the maximum calculable range for vertices. A processing group that the camera is located in is determined and it's position normalized based on the processing group location. Only those vertices associated with the same processing group as the camera are processed further. Alternatively, as described further below, vertices from a plurality of processing groups adjacent to the camera's processing group may be retained.

If the normalization uses static processing groups, after adding any required vertices, the vertices are grouped during the import phase to tag a processing group it belongs in. If a vertex is connected to other vertices in a different processing group, the vertex will also be assigned to the processing group of the connected vertices. The processing groups are shown in 2D form in FIG. 8. This grouping is based on a known factor of (W) groups along X, such that a given processing group of camera location can be determined by floor(x/22130)+W*floor(y/22130). For full 3D, this includes a D parameter, which is the number of processing groups along the y-axis, to accommodate Z, such that the group the camera is currently in is given by floor(x/22130)+W*floor(y/22130)+D*floor(z/22130).

The basic format for a 4 group 2D world is shown in FIG. 8. Given a view location (camera point) this formula can be used to quickly determine the processing groups that need to be included for further processing and rendering, and remove all external vertices not in the processing group from the rendering process before vertex processing. As described further herein, more than one processing group of vertices may be retained for processing. Further, a simple subtraction is performed against the camera coordinates with the vertex group coordinates for compliance along X, Y, Z to the range of −22130<(Cx−Vx)<22130. At any one time it is possible to have vertices occupying 4 cubic zones, as such some of the vertices within each of the zones would not be in range and would be dropped as a result of failing this test. Any group coordinates that fail this test are removed from the vertex stream.

Figure 9:
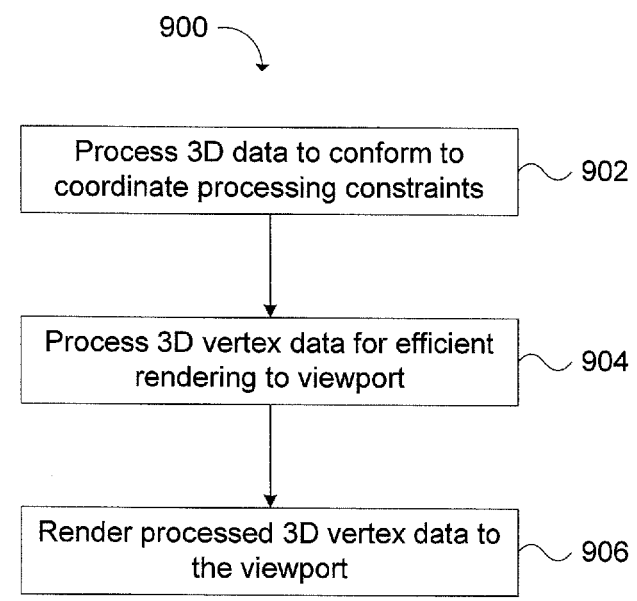
FIG. 9 depicts a further illustrative arrangement of processing zones in 2D.

By selecting the size of the processing groups based on a known factor for camera field of view (FOV), for example 90 dg at maximum Z of 4096, it is possible create the groups using the FOV limits as shown in FIG. 9 for a given object size of 32768×32768 and a FOV of 4096. In order to reduce the size of the processing group, it is also necessary to further subdivide triangles of the object so that the maximum length constraint is ½ the size of the processing group along an axis. For example, for the processing group size of 4096, the maximum length used for subdividing would be 2048. This increases the number of triangles which may slow down processing; however, many of the processing groups will be dropped and the associated triangles not processed.

Again, the above has been described in 2D for clarity, in 3D the Z axis is included resulting in a cubic divide of object space by FOV space. When preprocessing since the camera angle is arbitrary, all vertices within the 3 cubic groups surrounding the camera's occupied group in each axis (for X, Gx−1, Gx, Gx+1) are included. For the example of an object taking 32768×32768×32768 and a FOV of 4096, this would result in 512 cubic group groups, with only 27 (3×3×3) being processed per camera position, or approximately 5.27% of the total object vertices being passed through the vertex preprocessor before normal matrix vertex processing. Once the first transformation is complete, there is no need to recalculate the processing group that the camera resides in as it is not permissible to perform a subsequent transformation that would exceed the maximum range of each group. This ensures that by only determining single vertices that have exceeded the group maximum a new target group that the camera has been translated to or towards can be determined. This is done during the processing stage wherein the first vertex to fail outside of the calculation range will trigger a switch to include the next group along the axis that caused the failure. Since the maximum number of groups is known, the group mapping can simply follow the camera translations adding new groups and removing old ones during the camera translation processing.

The first camera calculation may be unusable since there is a high probability of calculations failing from being outside of the calculation constraints. However, it is not necessary to correct these, and the vertices may be dropped from rendering entirely (flagged as 0 in the screen Z coordinate as true invisible points would be). Subsequent calculations are within the correct group and no failures would occur. As the camera moves, it will hit the computational limit as it leaves a "group" and enters a new one, although it is noted that groups do not need to be hard groups, but instead may simply be a subtractive relative offset value per axis. As soon as an error occurs, the group is adjusted. This could result in several incorrect calculations along the frustum edges and the associated points not being rendered. This can be overcome by limiting the size of each processing group to a fraction of the total available range dictated by the processing constraints for integer arithmetic, such as only 4096, which limits the potential errors to only a small percentage of the triangles rendered along the limits of the view frustum. Since the rendering process can clip along the X and Y axis to narrow the displayed frustum, these anomalies are not visible to the user. The camera cannot move too quickly in a single subsequent frame without causing a potentially large number of errors, so this is normally limited. However, even so, the artifacts produced by a too fast moving camera within a couple of frames are normally not detectable by the human eye as the brain interprets the data as "motion blur".

Regardless of if processing groups are statically determined or if the processing group is determined dynamically, vertices are culled from further processing. For static processing groups the culling may determine a processing group from the location of the camera and cull all vertices not associated with the determined processing group. The camera position may be normalized to the processing group. The vertices of the processing group may be normalized to the camera position within the processing group. For a dynamic processing group, vertices are culled from further processing by normalizing all of the vertices' coordinates to the camera position and culling all vertices having coordinates outside of the maximum coordinate range, for example −22130 to +22130.

After culling vertices, all remaining vertices are further processed and rendered. All coordinates of the remaining vertices, and the camera position, that have been normalized to the camera position will be within the maximum coordinate range which ensures that the subsequent processing and rendering can be efficiently performed using integer based arithmetic in 32 bits.

Processing of Vertex Data for Rendering

Once culling of the vertices as described above is complete, the vertex data sent to the matrix processing operations will satisfy the maximum coordinate constraints set forth above, namely each coordinate will be in the range of −22130 to +22130, and as such the processing may be efficiently carried out on a simple 32 bit processor having no specialized floating point calculation functionality. Further vertices may be culled from subsequent processing using the near-clip and far-clip of the camera.

```
V->WorldTPos.m_sZ = (((YI_INT32) V->InitialPos.m_sX *
    m[YI_INDEX3X4(2,0)] + (YI_INT32) V->InitialPos.m_sY *
    m[YI_INDEX3X4(2,1)] + (YI_INT32) V->InitialPos.m_sZ *
    m[YI_INDEX3X4(2,2)]) >> YI_TRIG_SHIFT) +
    m[YI_INDEX3X4(2,3)];
if (( V->WorldTPos.m_sZ >= m_nCameraClipClose) || (V-
    >WorldTPos.m_sZ <= m_nCameraClipFar))
{
    V->ScreenPos.m_sZ = 0;
    V++;
    continue;
}
```

In the above:
V→WorldTPos is the world (camera transformed 3D) vertex position
V→InitialPos is the initial coordinate position of the vertex
V→ScreenPos is the on screen pixel location of the transformed vertex (2D)
YI_INT32 is a replacement for normal C int, or 32 bit integer value.
m[ ] is the current transform matrix
YI_INDEX3×4 is a macro to find the element in matrix M at the specified position
YI_TRIG_SHIFT is the fixed point shift value for trigonometry as noted earlier (14 bits)
m_nCameraClipClose and m_nCameraClipFar are integer values of the valid Z range for camera view (clip if the object is too close or too far from the viewer)

The above code example finds the world transformed Z coordinate for a given vertex using the current transform matrix. This is the current user transform, including scaling, rotation and translation of the objects and is further based on the camera position and orientation. The values of the transformation matrix are constrained to at most $2^{16}$ as described above. The cast to a 32 bit integer value is done since the original vertices are limited to 16 bit integers and the full 32 bits is used for the calculation. The initial Z coordinate is transformed to the world location, then checked against view limits that may be set by the user for rendering objects close to the viewer (may not be desired as the object may fill the display with one large polygon) or too far (limiting view distance to a reasonable amount, perhaps with fogging effects in the distance, etc). If the vertex is rejected, the screen coordinate is set so that the coordinate is not further processed during rendered. For example 0 in the Z position of the screen coordinate means reject it. Alternatively the culling of vertices may delete the culled vertices from a vertex list.

As can be seen in the code snippet above, the calculation for the vertex coordinate Z is constrained to a 32 bit YI_INT32 range. The matrix m is used as the transformation matrix based on the desired camera position and orientation and any user transformations to the objects. The source data V→InitialPos is translated to the camera position during the culling process as described above to ensure it does not exceed the constraints of −22130<Vx<22130, such that the resulting translation matrix calculation only contains local view transformations. The trigonometric tables are shifted by 14 bits as described above, and YI_TRIG_SHIFT (set at 14) shifts the result data after multiplication to fit within our 32 bit range. Since the trigonometric tables use a 14 bit fractional precision and are shifted right by 14 bits to remove the fractional component, so a value of 1.0 such as in COS(0) provides 16384, the results need to be shifted back. After the multiplications by the trigonometric values, the vertices are now scaled by 16384 over their true value and must be reduced back to normal by dividing, or shifting, by the trig scaling.

The total RISC operations per Z coordinate at this stage are 3 multiplications, 3 additions, and 1 bit shift. Given that these 3 operations are performed in minimal cycles on most RISC CPU's, throughput performance is very high. By culling further vertices based on the Z coordinate at this stage as seen in the "if" statement above, the X and Y transformations are avoided on any vertex that lies outside of the Z view range, resulting in a reduction in required cycles from 9 multiplications, 9 additions, and 3 bit shifts for all 3 axis combined before rejecting the vertex from the rendering process. This permits a 3 times faster removal of invalid vertices from the rendering pipeline.

After culling additional vertices based on the near and far clip zones, vertex X,Y matrix transformations are performed. The matrix transformation is similar to the code given above, only for the X and Y portions of the given vertex using the appropriate portions of the translation matrix. Additionally, no check is made on the X and Y portions with regards to near and far clipping, that is no further vertices are culled during the X and Y transformations.

Rendering

Once the vertex data is transformed into world space, the transformed vertex data is passed to a rendering pipeline and the 2D projection to a viewport is generated. Standard methods of projection to a 2D viewport and highly optimized RISC CPU based triangle scan line rendering functions may be used.

Figure 10:
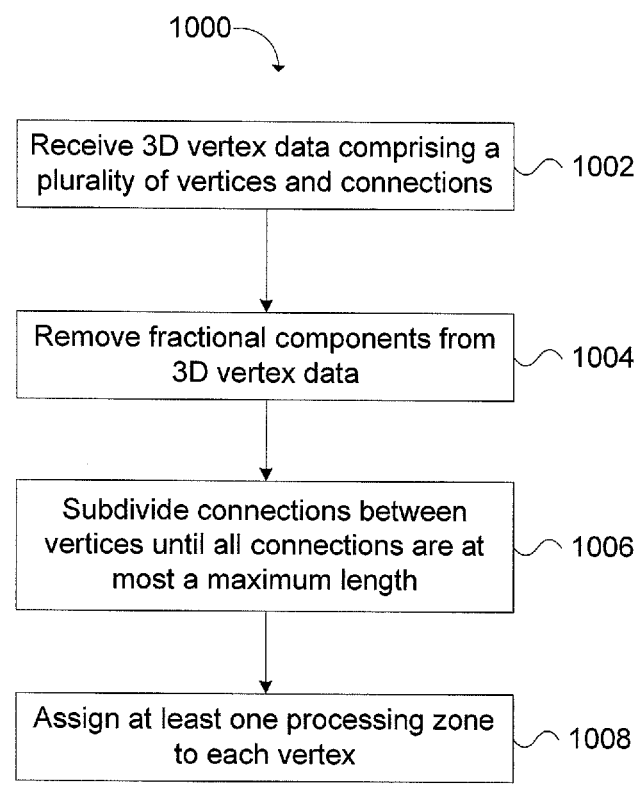
FIG. 10 depicts a method of rendering arbitrary 3D data.

With reference to FIG. 10, a method of rendering arbitrary 3D vertex data on a device having limited processing, such as a 32 bit RISC processor, is described. The method 1000 receives and processes the arbitrary 3D data to conform to coordinate processing constraints (1002). The processing constraints limit the maximum length, along an axis, of an edge connecting two vertices. The maximum length may be limited based on processing constraints of the processor in order to ensure that subsequent matrix math can be efficiently performed within 32 bits. Additionally or alternatively the maximum length may be limited based on a field of view size. The vertex data may also include grouping information for associating each of the vertices with one or more processing groups. Each vertex may be assigned to a processing group according to the equation floor(x/MaxLengthConstr)+ W*floor(y/MaxLengthConstr)+D*floor(z/MaxLengthConstr).

where:
  x, y, z are the vertex coordinates;
  W is the number of processing groups in the x-axis;
  D is the number of processing groups in the y-axis; and
  MaxLengthConstraint is the maximum length along an axis of an edge connecting two vertices. For example, from the specific embodiments above, the MaxLengthConstraint may equal 22130 or 4096.

Processing of the arbitrary 3D data in order to provide 3D vertex data conforming to the processing constraints may be performed on a separate computer or processor with greater processing capabilities than the device that will render the data.

The 3D vertex data that conforms to the processing constraints is then processed for efficient rendering to the viewport (1004). The processing may determine a processing group, and possible adjacent groups, that a camera position is in and cull all vertices not associated with the determined group or groups. Additionally or alternatively, vertices may be culled by normalizing all vertices to the camera position and culling all vertices having at least one co-ordinate outside of the maximum coordinate range of at most $-2^{15}$ to $+2^{15}$, or more particularly −22130 to +22130. As a result of the culling the process, the remaining vertices are translated based on the camera position in order to be in a processable range optimized for subsequent processing on the 32 bit processor. The remaining vertices may then be transformed using a transformation matrix that transforms the vertices according to the camera position and orientation and any user transformations to the objects. The values of the transformation matrix are constrained to be representable within 16 bits. Once the remaining 3D vertices have been processed to their final position according to the transformation matrix, they are passed to a rendering pipeline and rendered to the 2D viewport (1006).

Figure 11:
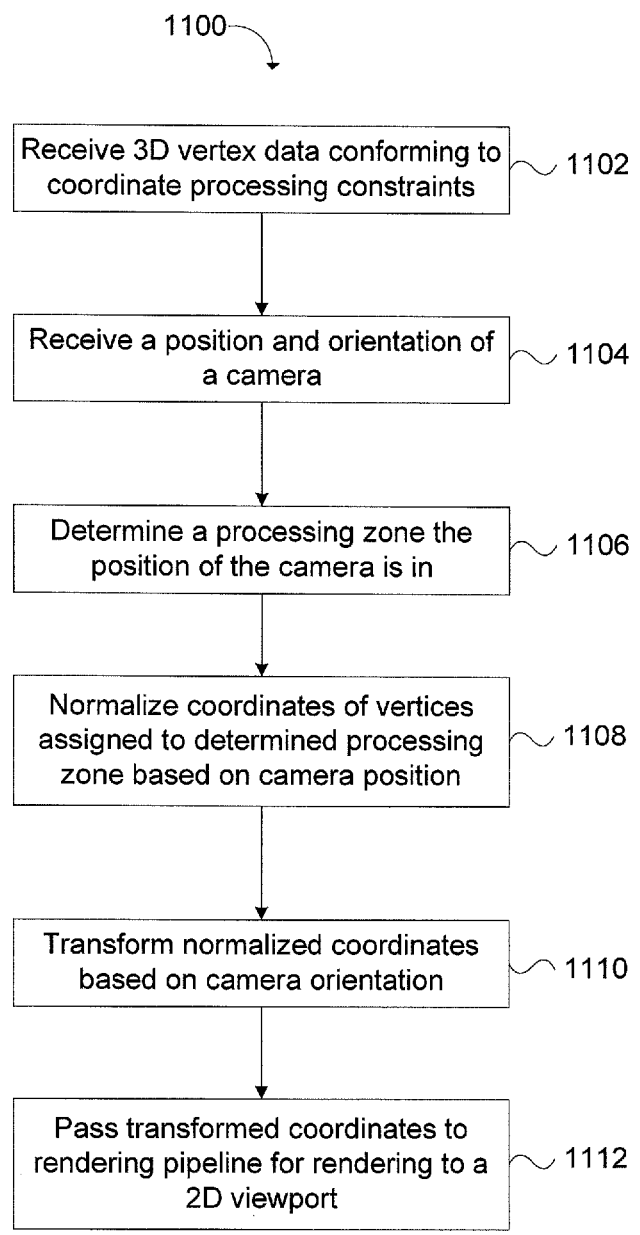
FIG. 11 depicts a method of processing arbitrary 3D data so that it conforms to coordinate processing constraints.

With reference to FIG. 11, a method of processing arbitrary 3D vertex data to meet processing constraints is described. The method 1100 receives the arbitrary 3D vertex data that comprises a plurality of vertices and connections (1102). If the arbitrary data includes fractional components in the vertex coordinates, the arbitrary data may be processed to remove the fractional components normally through scaling and vertex reduction to keep relative detail intact, although simple truncation or rounding of fractional components may also be used (1104). Once the arbitrary 3D data comprises only integers, the connections between vertices are subdivided until all connections are at most a maximum length along an axis (1106). For example, a connection parallel to the x-axis or y-axis may have length of at most the maximum length; however a diagonal line may have a length that is greater than this maximum length. Optionally, if static processing groups are used in the culling process, the vertices can be assigned to one or more processing groups (1108) as described above.

Figure 12:
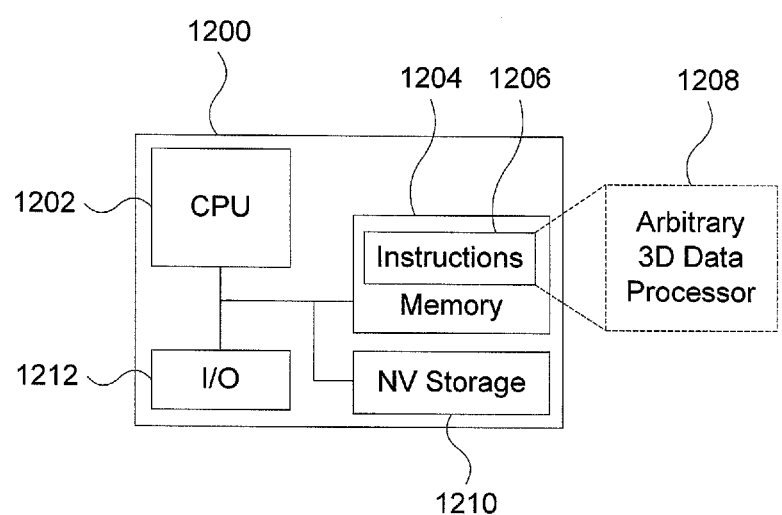
FIG. 12 depicts a method of rendering 3D data conforming to coordinate processing constraints.

With reference to FIG. 12, a method of rendering 3D vertex data on a device having limited processing resources, such as a 32-Bit RISC processor, is described. The method 1200 uses static processing groups associated with vertex data to cull vertices. The method 1200 receives 3D vertex data that conforms to coordinate processing constraints (1202). As such, each connection between vertices is at most a maximum length along an axis. The maximum length may be based on mathematical restrictions that ensure subsequent processing may be completed inside of 32 bits using only integer based math. In order to use processing groups when culling vertices, the coordinate processing constraints also require that each vertex is associated with at least one processing group.

The method 1200 receives a position and orientation of a camera (1204) through which the received 3D vertex data is to be viewed. A processing zone that the camera is in is determined (1206) and the coordinates of the vertices assigned to the determined processing zone are normalized based on the camera position (1208). Alternatively, the vertices may be normalized to the processing zone when importing and transforming arbitrary 3D data to conform to the processing constraints. The remaining vertices not assigned to the determined processing zone are culled from further processing. It is noted that depending on the size of the processing zones, one or more processing zones may be determined based on the position of the camera in order to ensure all viewable vertices are processed. In 3D for example, a 3×3×3 cube of processing zones may be selected, with the center of the cube being the processing zone the camera is in.

The vertices remaining after culling are transformed according to a transformation matrix based on the camera position and orientation (1210). It is noted that the transformation matrix may not need to translate the vertices based on the position since the vertices have been normalized based on the position. The transformation matrix may use a look-up-table of trigonometric functions in order to avoid having to calculate the computationally complex trigonometric functions. Furthermore, the calculations required for the transformation can be computed using integer math within 32 bits. Since the vertex coordinates are constrained for fitting within 16 bits, the values of the transformation matrix are also constrained to 16 bits. The transformed vertices are passed a rendering pipeline for rendering the transformed 3D data to a 2D viewport (1212).

Figure 13:
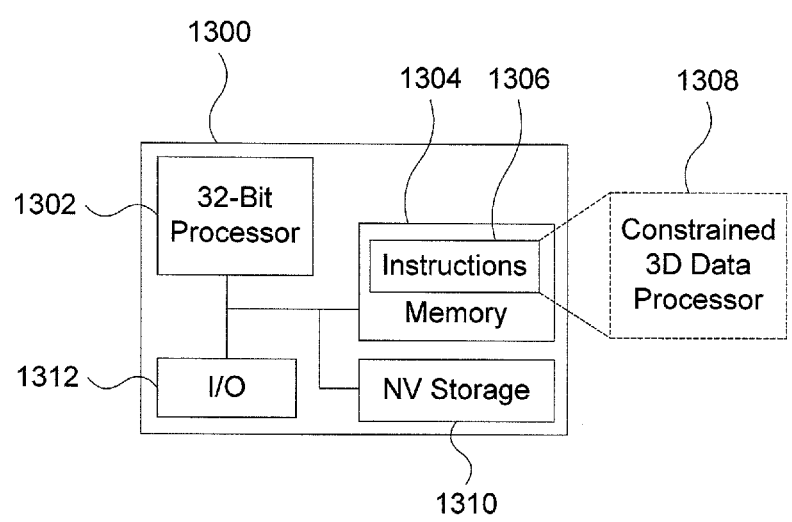
FIG. 13 depicts a further method of rendering 3D data conforming to coordinate processing constraints.

With reference to FIG. 13, a further method of rendering 3D vertex data on a device having limited processing resources, such as a 32-Bit RISC processor, is described. The method 1300 uses dynamic processing groups for culling vertices. The method 1300 receives 3D vertex data that conforms to coordinate processing constraints (1302). A camera position is received (1304) and the vertices, and camera position, are normalized to the received camera position (1306). Vertices are culled from further processing and rendering (1308). All vertices having a normalized coordinate value in at least one axis outside the maximum coordinate range is culled. The vertices may be tagged or otherwise marked, for example setting a z-position value to 0, for culling so that they are not processed by further processing and rendering stages. Alternatively, the culled vertices may be deleted or removed from a vertex list passed on for further processing. After culling vertices, the remaining vertices are transformed and rendered (1310).

Regardless of whether vertex coordinates are grouped into static processing groups and culled based on the processing group of the camera, or are culled based on vertex coordinates normalized to the camera position, vertices are culled based on a distance between the vertex and the camera position, along any of the axes.

Figure 14:
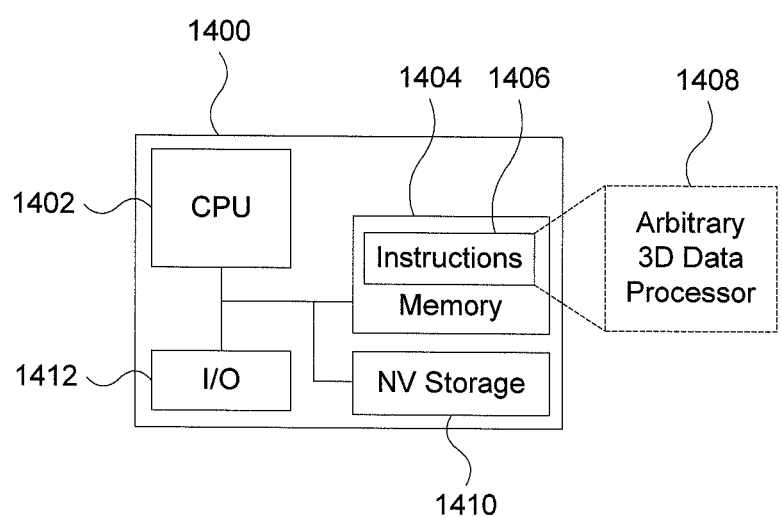
FIG. 14 depicts a device for processing arbitrary 3D data so that it conforms to coordinate processing constraints.

With reference to FIG. 14, there is described a device that may be used to process arbitrary 3D data so that it conforms to processing constraints. The device 1400 comprises a processor 1402 and memory 1404 storing instructions 1406. The processor may be any suitable processor having sufficient processing power in order to process the arbitrary 3D data in an appropriate or acceptable amount of time. The device 1400 may also comprise non-volatile storage 1408 for storing data and the instructions 1406. An input/output component 1410 is depicted. Various I/O components may be included such as a display, a keyboard, a mouse. Other I/O devices may also be connected.

The processor 1402 executes the instructions 1406 stored in memory 1404. The instructions 1406, when executed by the processor 1402, configure the device 1400 to provide an arbitrary 3D data processor 1412. The arbitrary 3D data processor 1412 receives and processes arbitrary 3D data and produces 3D vertex data such that each connection between vertices has a maximum length and each vertex is assigned to one or more processing groups. For example, the arbitrary 3D data processor 1412 may comprise instructions for implementing the method described above with reference to FIG. 10.

Figure 15:
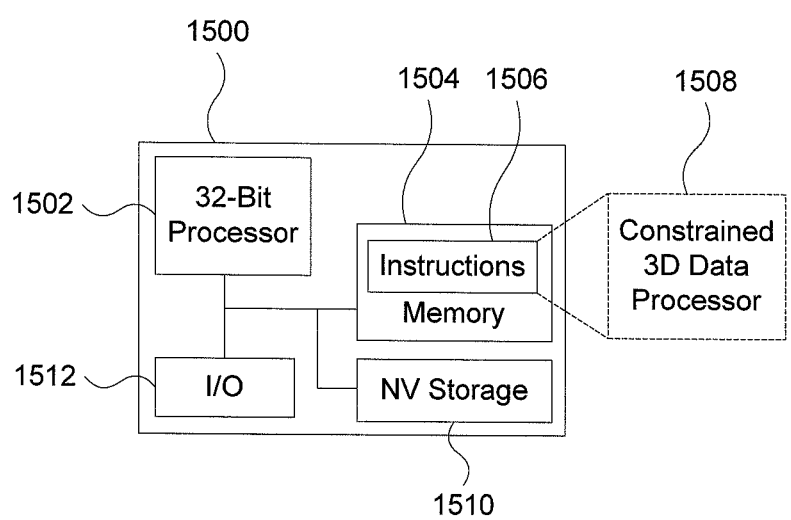
FIG. 15 depicts a device for rendering 3D data conforming to coordinate processing constraints.

With reference to FIG. 15, there is described a device that may be used to render 3D data that conforms to processing constraints. The device 1500 comprises a processor 1502 and memory 1504 storing instructions 1506. The processor 1502 is a processor having limited processing capabilities. For example it may be a 32-bit RISC processor that lacks functionality for efficiently performing floating point calculations. The device 1500 may also comprise non-volatile storage 1508 for storing data and the instructions 1506. An input/output component 1510 is depicted. Various I/O components may be included such as a display, a keyboard, a mouse. Other I/O devices may also be connected.

The processor 1502 executes the instructions 1506 stored in memory 1504. The instructions 1506, when executed by the processor 1502, configure the device 1500 to provide a constrained 3D data processor 1512. The constrained 3D data processor 1512 receives and renders 3D data conforming to coordinate processing constraints so that each connection between vertices has a maximum length. For example, the constrained 3D data processor 1512 may comprise instructions for implementing the method described above with reference to either FIG. 12 or 13. The device may be embodied in a portable or mobile electronic device such as but not limited to smartphones, music players, mp3 medias, media players, cellphones, mobile phones GPS mapping devices, Internet Tablets, Kiosks.

Although certain methods, apparatus, and articles of manufacture have been described herein, the scope of coverage of this patent is not limited thereto. To the contrary, this patent covers all methods, apparatus, computer readable memory, and articles of manufacture fairly falling within the scope of the appended claims either literally or under the doctrine of equivalents.

What is claimed is:

1. A method for rendering 3-dimensional (3D) vertex data to a 2-dimensional (2D) viewport using integer based arithmetic of a 32-bit load store architecture processing unit lacking a floating-point processing unit (FPU), the method comprising:

receiving at the processing unit 3D vertex data comprising a plurality of vertices and connections between vertices conforming to coordinate processing constraints limiting a maximum length of each of the connections between vertices to ½ of a maximum vertex coordinate range of −2x to +2x;

receiving at the processing unit a position of a camera to render the 3D vertex data from;

culling from rendering to the 2D viewport each vertex of the plurality of vertices having a distance from the camera position along at least one axis greater than a maximum length constraint; and rendering to the 2D viewport remaining vertices using a transformation matrix comprising a plurality of values having a maximum value of 2y;

wherein x+y<=32.

2. The method of claim 1, wherein x=y=16.

3. The method of claim 1, wherein culling vertices comprises first culling each vertex of the plurality of vertices having a distance from the camera position along the Z-axis greater than the maximum length constraint.

4. The method of claim 1, further comprising culling each vertex of the plurality of vertices having a difference between a Z-coordinate of the camera position and a Z-coordinate of the vertex outside the range of a near-clip value of the camera and a far-clip value of the camera.

5. The method of claim 3, wherein culling vertices further comprises culling each vertex of the remaining vertices having a distance from the camera position along either the X-axis or the Y-axis greater than the maximum length constraint.

6. The method of claim 1, further comprising normalizing the coordinates of the remaining vertices to the camera position for rendering to the 2D viewport.

7. The method of claim 1, further comprising normalizing the coordinates of the plurality of vertices to the camera position for culling vertices having a distance from the camera position greater than the maximum length constraint.

8. The method of claim 1, wherein culling vertices from rendering comprises one of:
setting a Z-coordinate of the vertex to 0; and
removing the vertex from the plurality of vertices to be rendered.

9. The method of claim 1, wherein the maximum length constraint is less than) 215/[2*sin(45°)].

10. The method of claim 9, wherein the maximum length constraint is less than, or equal to, 22130.

11. The method of claim 1, wherein each vertex of the received 3D vertex is associated with at least one processing zone of a plurality of processing zones, and wherein culling vertices comprises:
determining at least one processing zone based on the camera position; and
culling each vertex of the plurality of vertices not associated with the determined at least one processing zone of the camera position.

12. The method of claim 11, wherein a plurality of processing zones are determined based on the camera position, the plurality of processing zones comprising the processing zone based on the camera position and immediately adjacent processing zones.

13. The method of claim 11, wherein the processing zone of the camera is in is determined according to the equation:

$$\text{floor}(x/\text{MaxLength}) + \text{floor}(W*y/\text{MaxLength}) + \text{floor}(D*z/\text{MaxLength}), \text{ where}$$

x, y and z are the coordinates of the location position of the camera;

MaxLength is the maximum length of a line segment according to the maximum length constraint;

W is the number of processing zones along an X-axis; and

D is the number of processing zones along a Y-axis.

14. The method of claim 1, wherein rendering the remaining vertices comprises:
transforming the remaining vertex data based on the transformation matrix; and
projecting the transformed vertex data to 2D.

15. The method of claim 14, wherein rotating comprises using a trigonometric table with 16 bit values for sine (angle)*2-14 or cosine (angle)*2-14 to provide a scaling factor for reduction of 3D vertex data.

16. The method of claim 14, wherein scaling comprises multiplying a vertex by a multiple of a scale factor.

17. A method of processing 3D vertex data to conform to coordinate processing constraints for further processing using integer arithmetic using a processor, the processor executing instructions stored in a memory implementing the method comprising:
receiving 3D vertex data comprising a plurality of vertices and connections
adding one or more vertices to the 3D vertex data to subdivide connections between two vertices so that the all connections have a maximum size determined by a maximum length constraint of 215; and
assigning each of the vertices of 3D data to at least one respective processing zone of a plurality of processing zones,
wherein the 3D vertex data is provided to a 32-bit load store architecture processor lacking a floating-point processing unit (FPU).for rendering to a 2D viewport.

18. The method of claim 17, wherein the maximum length constraint is 22130.

19. The method of claim 17, wherein each processing zone is a cube having sides of at most a length of the maximum length constraint.

20. The method of claim 17, further comprising removing any fractional components from the 3D vertex data.

21. A device for rendering 3D vertex data, the device comprising:
a display for displaying information;
a 32-bit load-store architecture processor lacking a floating-point processing unit (FPU) for executing instructions;
a memory for storing instructions that when executed by the processor configure the device to implement a method of processing 3D vertex data for rendering to the display using integer arithmetic comprising:
receiving at the processing unit 3D vertex data comprising a plurality of vertices and connections between vertices conforming to coordinate processing constraints limiting a maximum length of each of the connections between vertices to a maximum length constraint of −2x to +2x;
receiving at the processing unit a position of a camera to render the 3D vertex data from;
culling from rendering to the 2D viewport each vertex of the plurality of vertices having a distance from the camera position along at least one axis greater than a maximum length constraint; and
rendering to the 2D viewport remaining vertices using a transformation matrix comprising a plurality of values having a maximum value of 2y;
wherein x+y<=32.

22. A device for processing 3D vertex data, the device comprising:
a processor for executing instructions; and
a memory for storing instructions that when executed by the processor configure the device to implement a method of pre-processing 3D vertex data for eventual rendering to a display of a device having a 32-bit load-store architecture processor lacking a floating-point processing unit (FPU), the method comprising:
receiving 3D vertex data comprising a plurality of vertices and connections;
adding one or more vertices to the 3D vertex data to subdivide connections between two vertices so that the all connections have a maximum size determined by a maximum length constraint of 215; and
assigning each of the vertices of 3D data to at least one respective processing zone of a plurality of processing zones;
wherein the 3D vertex data is provided to a 32-bit load store architecture processor lacking a floating-point processing unit (FPU).for rendering to a 2D viewport.

* * * * *